United States Patent Office
3,013,063
Patented Dec. 12, 1961

3,013,063
NOVEL SUBSTITUTED 1,2,3,4,4a,9,9a,10-OCTA-HYDRO - 4,10 - DIOXO - 2 - ANTHRACENE-ACETIC ACIDS AND ESTERS THEREOF
Thomas Lynn Fields, Pearl River, and Andrew Steven Kende, Hartsdale, N.Y., assignors to American Cyanamid Company, New York, N.Y., a corporation of Maine
No Drawing. Filed Dec. 22, 1959, Ser. No. 861,174
8 Claims. (Cl. 260—473)

This invention relates to new organic compounds and, more particularly, is concerned with novel substituted 1,2,3,4,4a,9,9a,10 - octahydro - 4,10 - dioxo - 2 - anthraceneacetic acids and esters thereof, and to a stereospecific method of preparing these novel compounds. The novel substituted 1,2,3,4,4a,9,9a,10-octahydro-4,10-dioxo-2-anthraceneacetic acids and esters of the present invention may be represented by the following general formulas:

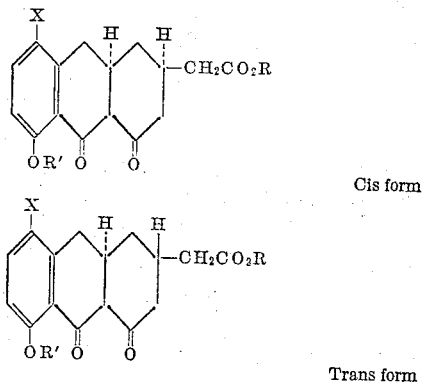

Cis form

Trans form wherein X is halogen, R is hydrogen or lower alkyl, and R' is hydrogen, lower alkyl, or aralkyl. Suitable lower alkyl groups contemplated by the present invention are those having up to about six carbon atoms. Suitable aralkyl groups are benzyl, phenethyl, etc. Typical compounds represented by the above general formulas are, for example, 8-chloro-5-hydroxy-1,2,3,4,4a,9,9a,10-octahydro-4,10-dioxo-2-anthraceneacetic acid,
ethyl 8-chloro-5-hydroxy-1,2,3,4,4a,9,9a,10-octahydro-4,10-dioxo-2-anthraceneacetate,
8-chloro-5-methoxy-1,2,3,4,4a,9,9a,10-octahydro-4,10-dioxo-2-anthraceneacetic acid,
ethyl 8-chloro-5-methoxy-1,2,3,4,4a,9,9a,10-octahydro-4,10-dioxo-2-anthraceneacetate,
8-chloro-5-benzyloxy-1,2,3,4,4a,9,9a,10-octahydro-4,10-dioxo-2-anthraceneacetic acid, and
methyl 8-chloro-5-benzyloxy-1,2,3,4,4a,9,9a,10-octahydro-4,10-dioxo-2-anthraceneacetate.

The novel compounds of the present invention are particularly useful as chelating, complexing or sequestering agents for polyvalent metallic ions. The complexes formed with polyvalent metallic ions are particularly stable and usually quite soluble in various organic solvents. This, of course, makes them useful for a variety of purposes such as in biological experimentation where the removal of traces of polyvalent metallic ions may be of great importance. They are also useful in analyses for polyvalent metallic ions which may be complexed and extracted by means of these reagents. Other uses common to sequestering agents are also apparent for these compounds.

The novel compounds of the present invention are also useful in the synthesis of physiologically active antibiotics of the tetracycline series. For example, a substituted 1,2,3,4,4a,9,9a,10 - octahydro - 4,10 - dioxo - 2 - anthraceneacetic acid may be converted to its corresponding acyl halide by treatment with a suitable agent such as oxalyl chloride, phosphorus pentachloride or thionyl chloride; or alternatively, the mixed carboxylic-carbonic anhydride derivative may be prepared in the usual manner. The corresponding acyl malonate may then be prepared by treating the intermediate acyl derivative with sodium or magnesium diethylmalonate. The acyl malonate may then be cyclized with a strongly basic condensing agent such as sodium hydride, sodium metal, an alkali metal alkoxide, or the like, to the ethyl ester of the corresponding substituted 1,2,3,4,4a,5,5a,6,11,11a,12,12a - dodecahydro - 1,3,11,12 - tetraoxo - naphthacene - 2 - carboxylic acid. Due to the fact that the esters of the novel substituted 1,2,3,4,4a,9,9a,10 - octahydro - 4,10 - dioxo - 2 - anthraceneacetic acids of the present invention cannot usually be hydrolyzed to the corresponding free acids without extensive decomposition, it is clear that the preparation of tetracyclic compounds from the esters by way of the corresponding acyl malonates cannot conveniently be undertaken.

The novel substituted 1,2,3,4,4a,9,9a,10 - octahydro-4,10 - dioxo - 2 - anthraceneacetic esters of the present invention are prepared by a series of reactions starting with the corresponding 1,2,3,4 - tetrahydro - 4 - oxo-2-naphthaleneacetaldehydes disclosed and claimed in the copending application of Raymond G. Wilkinson et al., Serial No. 748,613, filed July 15, 1958. In accordance with the present invention, an appropriately substituted 1,2,3,4-tetrahydro - 4 - oxo - 2 - naphthaleneacetaldehyde is first converted to the corresponding 2,2' - dicyano - 3 - (1,2,3,4-tetrahydro - 4 - oxo - 2 - naphthylmethyl)glutaramide by treatment with cyanoacetamide in the presence of piperidine as a catalyst. This dicyano compound is then hydrolyzed in the presence of a mineral acid to the corresponding 3-(1,2,3,4 - tetrahydro - 4 - oxo - 2 - naphthylmethyl)-glutaric acid. The di(lower)alkyl ester of this glutaric acid is then prepared by direct esterification with a lower alkanol in the presence of sulfuric acid as a catalyst. The di(lower)alkyl 3 - (1,2,3,4 - tetrahydro - 4 - oxo - 2-naphthylmethyl)glutarate is then cyclized with a strongly basic condensing agent such as sodium hydride, sodium metal, an alkali metal alkoxide, or the like, in a neutral anhydrous solvent such as benzene, toluene, xylene, or the like, at a temperature of from 50° to 150° C., to the lower alkyl ester of the corresponding 1,2,3,4,4a,9,9a,10-octahydro - 4,10 - dioxo - 2 - anthraceneacetic acid. The final products, the various intermediates, and the reactions set forth immediately above are disclosed but not claimed in the copending application of Raymond G. Wilkinson et al., Serial No. 790,051, filed January 30, 1959.

Since the esters of the novel substituted 1,2,3,4,4a,9,9a,10-octahydro-4,10-dioxo-2-anthraceneacetic acids of the present invention cannot usually be hydrolyzed to the corresponding free acids without extensive decomposition, an alternate synthetic route is necessary for the preparation of the substituted 1,2,3,4,4a,9,9a,10-octahydro-4,10-dioxo-2-anthraceneacetic acids. In accordance with the present invention, an appropriately substituted 3-(1,2,3,4-tetrahydro-4-oxo-2-naphthylmethyl)glutaric acid, prepared as set forth in the preceding paragraph, is first converted to the corresponding glutaric acid anhydride by treatment with a suitable dehydrating agent such as acetic anhydride. The mono(lower)alkyl ester of the 3-(1,2,3,4-tetrahydro-4-oxo-2-naphthylmethyl)glutaric acid is then obtained by subjecting the anhydride to alcoholysis with an alkali metal alkoxide of a lower alkanol at room temperature. This monoester is then cyclized to the corresponding 1,2,3,4,4a,9,9a,10-octahydro-4,10-dioxo - 2 - anthraceneacetic acid with a strongly basic condensing agent such as sodium hydride, sodium metal, an alkali metal alkoxide, or the like, in a neutral anhydrous solvent such as benzene, toluene, xylene, or the like, at a temperature of from 50° to 150° C.

It is a singular advantage of the present invention that the cyclization reactions whereby both the free acids and the esters of the novel substituted 1,2,3,4,4a,9,9a,10-octahydro-4,10-dioxo-2-anthraceneacetic acids are obtained are stereospecific, yielding predominantly the desired cis isomers. Thus, for example, the mixture of diastereoisomeric monomethyl esters of 3-(8-chloro-5-benzyloxy-1,2,3,4-tetrahydro-4-oxo - 2 - naphthylmethyl)-glutaric acid yields 30 to 40% of the cis isomer of 8-chloro-5-benzyloxy-1,2,3,4,4a,9,9a,10-octahydro-4,10 - dioxo-2-anthraceneacetic acid and only 5 to 10% of the trans isomer upon cyclization. The structural formulas for these 2 isomers are as follows:

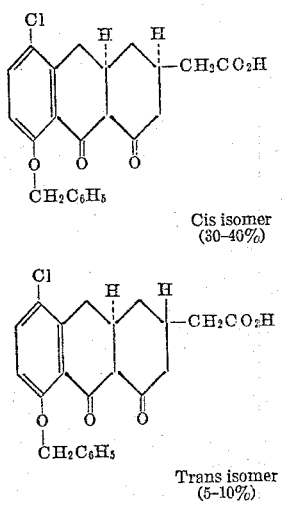

Cis isomer (30–40%)

Trans isomer (5–10%)

Similar stereospecificity is observed in the cyclization of the diesters of the correspondingly substituted 3-(1,2,3,4-tetrahydro-4-oxo-2-naphthylmethyl)glutaric acids. Since the physiologically active antibiotics of the tetracycline series have the cis configuration corresponding to the cis configuration of the tricyclic compounds of the present invention, the stereospecificity of the cyclization reactions of the present invention makes it ultimately possible to synthesize the tetracycline group of antibiotics with the proper skeletal stereochemistry. Thus, the present invention provides a configurational solution to the overall total synthesis of the tetracycline group of antibiotics.

The novel substituted 1,2,3,4,4a,9,9a,10-octahydro-4,10-dioxo-2-anthraceneacetic acids and esters thereof of the present invention are crystalline solids sparingly soluble in water and crystallizable from solvents such as ether, ethyl acetate, benzene, toluene and the like.

The preparation of the novel compounds of the present invention is illustrated by the following examples:

EXAMPLE 1

*Preparation of 2,2'-dicyano-3-(8-chloro-5-methoxy-1,2,3,4-tetrahydro-4-oxo-2-naphthylmethyl)glutaramide*

2-chloro-5-methoxytoluene is converted to the corresponding benzyl bromide by reaction with N-bromo-succinimide. The 2-chloro-5-methoxybenzyl bromide so formed is reacted with diethyl sodiomalonate to form the corresponding benzylmalonic ester which is reduced with lithium aluminum hydride in a conventional manner to form the corresponding 1,3-diol. The resulting 2-(2'-chloro-5'-methoxybenzyl)-1,3-propanediol is reacted with methane sulfonyl chloride to form the corresponding bis-methane-sulfonate, which is converted to the corresponding dinitrile by reaction with potassium cyanide. The dinitrile so formed is hydrolyzed to the corresponding β-(2-chloro-5-methoxybenzyl)glutaric acid by treatment with base. The glutaric acid so formed is then reacted with polyphosphoric acid to form 8-chloro-5-methoxy-1,2,3,4-tetrahydro-4-oxo-2-naphthaleneacetic acid. The naphthaleneacetic acid so formed is converted to the corresponding acyl chloride by treatment with oxalyl chloride and the resulting acyl chloride is converted to the corresponding 8-chloro-5-methoxy-1,2,3,4-tetrahydro-4-oxo-2 - naphthaleneacetaldehyde by reducing the acyl chloride with hydrogen.

Cyanoacetamide (8.0 g.) and 8-chloro-5-methoxy-1,2,3,4-tetrahydro-4-oxo-2-naphthaleneacetaldehyde (8.0 g.), prepared as described above, were dissolved in absolute ethanol (300 ml.) with the aid of heat. The solution was cooled, filtered, five drops of piperidine added and the liquid was allowed to stand at room temperature for 24 hours. The white crystals (11.7 g.) which deposited were collected by suction filtration, washed with ether, and air-dried. This highly insoluble product had M.P. 140–155° C., but the M.P. of other batches run in a similar manner varied from 105° to 160° C. despite constant analyses. The sample was dried for analysis at 60° C. for three hours in vacuo.

*Analysis.*—Calculated for $C_{19}H_{19}O_4N_4Cl \cdot C_2H_6O$: C, 56.2; H, 5.62; N, 12.49; Cl, 7.92. Found: C, 55.6; H, 5.62; N, 12.54; Cl, 8.40.

EXAMPLE 2

*Preparation of 3-(8-chloro-5-hydroxy-1,2,3,4-tetrahydro-4-oxo-2-naphthylmethyl)glutaric acid*

2,2'-dicyano-3-(8-chloro - 5 - methoxy-1,2,3,4-tetrahydro-4-oxo-2-naphthylmethyl)glutaramide (10.0 g.) was slurried in a mixture of concentrated hydrochloric acid (405 ml.) and glacial acetic acid (135 ml.). Upon refluxing, a clear yellow solution formed which gradually turned bright red, then brown. After twelve hours, the reaction mixture was cooled and filtered. The filtrate was concentrated in vacuo to approximately two-thirds volume. The light yellow crystals which separated were collected on a filter, washed thoroughly with water and dried in vacuo over phosphorous pentoxide and potassium hydroxide pellets. Yield of the glutaric acid was 5.9 g., M.P. 177–80° C. Recrystallization from ethyl acetate raised the melting point to 181.5–182° C.

*Analysis.*—Calculated for $C_{16}H_{17}O_6Cl$: C, 56.4; H, 5.03; Cl, 10.42. Found: C, 56.45; H, 5.30; Cl, 10.36.

EXAMPLE 3

*Preparation of 3-(8-chloro-5-benzyloxy-1,2,3,4-tetrahydro-4-oxo-2-naphthylmethyl)glutaric acid*

3-(8 - chloro - 5 - hydroxy-1,2,3,4-tetrahydro-4-oxo-2-naphthylmethyl)glutaric acid (0.920 g.) was dissolved in 25 ml. of 1 N sodium hydroxide. Benzyl chloride (1.8 g.) was added and the mixture refluxed for two hours under nitrogen. The reaction mixture was cooled and extracted with five 20 ml. portions of ether. The aqueous layer was separated, acidified, and the tan oily solid which separated was extracted into ethyl acetate. The organic layer was dried over anhydrous magnesium sulfate, filtered and concentrated to a light tan solid in vacuo. The crude 3-(8-chloro-5-benzyloxy-1,2,3,4-tetrahydro-4-oxo-2-naphthylmethyl)glutaric acid (1.1 g.) was used without further purification. The analytical sample was obtained from ethyl acetate as a colorless microcrystalline solid, M.P. 174–176° C.

*Analysis.*—Calculated for $C_{23}H_{23}O_6Cl$: C, 64.2; H, 5.38; Cl, 8.25. Found: C, 64.6; H, 6.17; Cl, 8.22.

EXAMPLE 4

*Preparation of dimethyl 3-(8-chloro-5-benzyloxy-1,2,3,4-tetrahydro-4-oxo-2-naphthylmethyl)glutarate*

Crude 3-(8-chloro - 5 - benzyloxy-1,2,3,4-tetrahydro-4-oxo-2-naphthylmethyl)glutaric acid (1.1 g.) was dissolved in 50 ml. of methanol and one drop of concentrated sulfuric acid was added. The solution was refluxed on a steam bath for two hours, concentrated in vacuo to approximately 8 ml. and diluted with 50 ml. of ethyl acetate. The ethyl acetate solution was washed thrice with 20 ml. portions of 1 N sodium bicarbonate and thrice with 20 ml. portions of water. The organic layer was dried over anhydrous magnesium sulfate, filtered, and concentrated to an oily residue in vacuo. Yield of crude dimethyl 3-(8-chloro-5-benzyloxy-1,2,3,4-tetrahydro-4-oxo-2-naphthylmethyl)glutarate was 1.0 g. This crude material was used for cyclization without further purification. Recrystallization of crude diester from ether-petroleum ether produces an analytical sample, colorless crystals, M.P. 62–63° C.

*Analysis.*—Calculated for $C_{25}H_{27}O_6Cl$: C, 65.43; H, 5.93. Found: C, 65.10; H, 6.04.

EXAMPLE 5

*Preparation of methyl 8-chloro-5-benzyloxy-1,2,3,4,4a,9, 9a,10-octahydro-4,10-dioxo-2-anthraceneacetate*

Crude dimethyl 3-(8-chloro-5-benzyloxy-1,2,3,4-tetrahydro-4-oxo-2-naphthylmethyl)glutarate (1.73 g.) was dissolved in 100 ml. of toluene. Sodium hydride (230 mg.) was added and the mixture refluxed under nitrogen for 4.5 hours, cooled to room temperature and allowed to stand overnight. Additional sodium hydride (150 mg.) was added and the reaction was refluxed 1.5 hours. The excess sodium hydride was decomposed by the addition of 2 ml. of methanol. The solution was diluted with 50 ml. of chloroform, washed twice with 25 ml. portions of 1 N hydrochloric acid and twice with 25 ml. portions of water. The organic layer was separated, dried over anhydrous magnesium sulfate, filtered, and concentrated to an oily residue in vacuo. The residue was dissolved in 50 ml. of ether and 80 ml. of hexane was added. Upon standing at 5° C. overnight, small white crystals were deposited. The yield of the methyl 8-chloro-5-benzyloxy-1,2,3,4,4a,9,9a,10-octahydro-4,10-dioxo-2-anthraceneacetate was 495 mg., M.P. 100–105° C. Work-up of the filtrate yielded an additional 200 mg. of the desired cis ester. Total yield was 44% of theory. Repeated recrystallization of crude product from ether raises the M.P. of the cis ester to 117–121° C.

*Analysis.*—Calculated for $C_{24}H_{23}O_5Cl$: C, 67.5; H, 5.41; Cl, 8.31. Found: C, 67.47; H, 5.58; Cl, 8.85.

EXAMPLE 6

*Preparation of 3-(8-chloro-5-benzyloxy-1,2,3,4-tetrahydro-4-oxo-2-naphthylmethyl)glutaric anhydride*

3-(8-chloro-5-benzyloxy-1,2,3,4-tetrahydro-4-oxo-2-naphthylmethyl) glutaric acid (900 mg.) was slurried in 15 ml. of acetic anhydride and refluxed for one hour. The clear solution was concentrated by distillation to approximately 5 ml. Upon cooling, the white crystals which deposited were collected on a filter, washed well with ether and dried in vacuo at 60° C. The yield of pure anhydride was 743 mg., M.P. 192–193° C.

*Analysis.*—Calculated for $C_{23}H_{21}O_5Cl$: C, 66.90; H, 5.13; Cl, 8.59. Found: C, 66.64; H, 5.32; Cl, 8.60.

EXAMPLE 7

*Preparation of monomethyl 3-(8-chloro-5-benzyloxy-1,2, 3,4-tetrahydro-4-oxo-2-naphthylmethyl)glutarate*

3-(8-chloro-5-benzyloxy-1,2,3,4-tetrahydro - 4 - oxo-2-naphthylmethyl)glutaric anhydride (2.48 g.) was added to a solution of sodium methoxide (0.35 g.) in 60 ml. of absolute methanol and stirred at room temperature for two hours. The clear solution was diluted with 150 ml. of water and acidified by the addition of 10 ml. of 1 N hydrochloric acid. The oil which separated was extracted into ethyl acetate, washed with water, and dried over anhydrous magnesium sulfate. The clear solution was concentrated in vacuo. The residual oil was dissolved in 15 ml. of ether. Upon scratching, a white crystalline solid began precipitating. After 30 minutes this material was collected on a filter, washed with ether, and dried in vacuo at 60° C. The yield of monomethyl 3-(8-chloro-5-benzyloxy-1,2,3,4 - tetrahydro-4-oxo-2-naphthylmethyl)glutarate was 1.88 g. (71%), M.P. 113–127° C. The mixture of diasterioisomers was used for the cyclization without further purification.

*Analysis.*—Calculated for $C_{24}H_{25}O_6Cl$: C, 64.7; H, 5.66; Cl, 7.99. Found: C, 64.6; H, 5.91; Cl, 7.48.

EXAMPLE 8

*Preparation of 8-chloro-5-benzyloxy-1,2,3,4,4a,9,9a,10-octahydro-4,10-dioxo-2-anthraceneacetic acid*

A suspension of monomethyl 3-(8-chloro-5-benzyloxy-1,2,3,4 - tetrahydro-4-oxo-2-napthylmethyl)glutarate (4.5 g.) and sodium hydride in oil (2.5 g.) in 300 ml. of sodium dried toluene, was refluxed in a nitrogen atmosphere for 48 hours. The yellow suspension was cooled to room temperature and the excess sodium hydride decomposed by the careful addition of glacial acetic acid. The reaction mixture was then diluted with 100 ml. of ethyl acetate and the clear solution washed thoroughly with 100 ml. of cold 1 N sulfuric acid. The organic layer was separated, washed thrice with 75 ml. portions of water, and dried over anhydrous magnesium sulfate. The solution was concentrated in vacuo and the residual gum was slurried in 30 ml. of ether. The yellow crystals which formed were collected on a filter, washed with ether, and air dried. Yield of crude tricyclic acid was 2.2 g. (53%), M.P. 180–190° C. Two recrystallizations from absolute ethanol yielded 1.2 g. of pure cis 8-chloro-5-benzyloxy-1,2,3,4,4a,9,9a - 10 - octahydro-4,10-dioxo-2-anthraceneacetic acid, M.P. 198–199° C. The mother liquor from the first recrystallization, upon chilling, yielded 65 mg. of pure trans acid, M.P. 179° C.

*Analysis.*—Calculated for $C_{23}H_{21}O_5Cl$: C, 66.90; H, 5.13. Found: C, 66.57; H, 5.54 (cis); C, 66.53; H, 5.41 (trans).

EXAMPLE 9

*Preparation of ethyl 7-chloro-10-benzyloxy-1,2,3,4,4a,5,-5a,6,11,11a,12,12a - dodecahydro - 1,3,11,12 - tetraoxonaphthacene-2-carboxylate*

8-chloro - 5 - benzyloxy-1,2,3,4,4a,9,9a,10-octahydro-4,10-dioxo-2-anthraceneacetic acid (cis isomer) (600 mg.) was slurried in 60 ml. of sodium dried toluene. Triethylamine (0.48 ml.) was added and the cloudy suspension cooled in an ice-methanol bath to −10° C. Ethyl chloroformate (0.336 ml.) was added and the mixture stirred at −10° C. for 12 minutes. Diethyl magnesiomalonate (0.00348 mole in 8 ml. of toluene) was added, the ice bath removed, and the mixture stirred at room temperature overnight. The reaction mixture was diluted with 45 ml. of ethyl acetate and 50 ml. of cold 1 N sulfuric acid. The organic layer was separated and washed successively with water, 1 N sulfuric acid, and water. The organic phase was dried over anhydrous magnesium sulfate and concentrated in vacuo to a gum. Sodium hydride in oil (600 mg.) was added to a solution of the crude acyl malonate in 120 ml. of sodium dried toluene and the mixture refluxed in a nitrogen atmosphere. After 20 hours the bright orange-red suspension was cooled in an ice bath and the excess sodium hydride decomposed by the cautious addition of glacial acetic acid. The reaction mixture was then diluted with 6 ml. of absolute ethanol and 120 ml. of ethyl acetate. The orange solution was washed with 1 N sulfuric acid and four times with water. The organic layer was dried over anhydrous magnesium sulfate and concentrated in vacuo. The residual gum was dissolved in ether and, upon chilling, orange crystals were deposited. Yield of tetracyclic ester was 233 mg. (31.6%). A 50 mg. sample was recrystallized from 2 ml. of ethyl acetate. The yield was 34 mg., M.P. 151–154° C.

*Analysis.*—Calculated for $C_{28}H_{25}O_7Cl$: C, 66.08; H, 4.95. Found: C, 66.01; H, 5.54.

What is claimed is:
1. A compound of the formula:

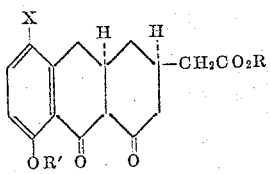

wherein X is halogen, R is a member of the group consisting of hydrogen and lower alkyl, and R' is a member of the group consisting of hydrogen, lower alkyl and phenyl lower alkyl.

2. A compound of the formula:

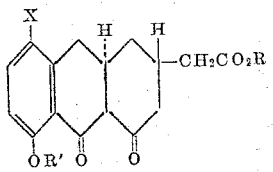

wherein X is halogen, R is a member of the group consisting of hydrogen and lower alkyl, and R' is a member of the group consisting of hydrogen, lower alkyl and phenyl lower alkyl.

3. 8 - chloro-5-benzyloxy-1,2,3,4,4a,9,9a,10-octahydro-4,10-dioxo-2-anthraceneacetic acid.

4. Methyl 8-chloro-5-benzyloxy-1,2,3,4,4a,9,9a,10-octahydro-4,10-dioxo-2-anthraceneacetate.

5. 8-chloro-5-methoxy - 1,2,3,4,4a,9,9a,10 - octahydro-4,10-dioxo-2-anthraceneacetic acid.

6. Ethyl 8 - chloro-5-methoxy-1,2,3,4,4a,9,9a,10-octahydro-4,10-dioxo-2-anthraceneacetate.

7. 8-chloro-5-hydroxy - 1,2,3,4,4a,9,9a,10 - octahydro-4,10-dioxo-2-anthraceneacetic acid.

8. Ethyl 8 - chloro-5-hydroxy-1,2,3,4,4a,9,9a,10-octahydro-4,10-dioxo-2-anthraceneacetate.

References Cited in the file of this patent
UNITED STATES PATENTS
2,783,261    Conovor _____ Feb. 26, 1957

OTHER REFERENCES

Fuson: "Advanced Organic Chemistry," pages 433–4, J. Wiley, 1950.

Boothe et al.: J. Am. Chem. Soc., 81, 1006–7, Feb. 20, 1959.